US006274830B1

(12) United States Patent
Thomas

(10) Patent No.: US 6,274,830 B1
(45) Date of Patent: Aug. 14, 2001

(54) STOP BLOCK WITH EMBEDDED PROXIMITY SWITCH

(75) Inventor: Timothy N. Thomas, Grosse Pointe Park, MI (US)

(73) Assignee: Welker Bearing Company, Troy, MI (US)

( * ) Notice: Subject to any disclaimer, the term of this patent is extended or adjusted under 35 U.S.C. 154(b) by 0 days.

(21) Appl. No.: 09/513,499

(22) Filed: Feb. 25, 2000

(51) Int. Cl.[7] .................... H01H 3/16; F16P 3/00

(52) U.S. Cl. .................... 200/61.58 R; 192/129 R; 192/138

(58) Field of Search .................... 200/52 R, 61.58 R, 200/600; 307/112–150; 192/116.5, 125 A–150

(56) References Cited

U.S. PATENT DOCUMENTS

| | | | | |
|---|---|---|---|---|
| 3,544,934 | | 12/1970 | Poliakoff | 335/206 |
| 4,090,091 | | 5/1978 | Brown et al. | 307/116 |
| 4,552,047 | * | 11/1985 | Stroup | 82/102 |
| 4,664,364 | | 5/1987 | Lymburner | 200/83 E X |
| 4,763,053 | * | 8/1988 | Rabe | 310/180 X |
| 4,788,856 | * | 12/1988 | Felger | 73/118.1 |
| 5,034,621 | | 7/1991 | Groves et al. | 307/117 |
| 5,272,911 | * | 12/1993 | Beggs et al. | 73/49.7 |
| 5,950,790 | * | 9/1999 | Barber | 192/139 |
| 6,066,824 | * | 5/2000 | Crawford et al. | 219/86.31 |

* cited by examiner

*Primary Examiner*—J. R. Scott
(74) *Attorney, Agent, or Firm*—Young & Basile, P.C.

(57) ABSTRACT

An improved stop block assembled to NAAMS™ specifications for providing a locating device for a movable member. The stop block has at least one crowned end for positioning to face the movable member and to accurately stop the movable member when the movable member comes in contact with the stop block. The improved stop block includes a proximity switch installed within the stop block for sensing when the movable member contacts the stop block. The improved stop block may also include an actuating device communicating with the proximity switch for sending a signal to a controlling device.

6 Claims, 3 Drawing Sheets

STOP BLOCK WITH EMBEDDED PROXIMITY SWITCH

FIELD OF THE INVENTION

The invention relates to an improvement over a stop block assembled to industry-wide specifications for providing a locating device for a movable member.

BACKGROUND OF THE INVENTION

In an assembly having a reciprocal member such as a piston on a rod it may sometimes be required to know when both the piston reaches the end of its cycle at a terminating point, as well as knowing that the piston stops exactly and repetitively at a precise position against the terminating point. As is conventionally known, a cylinder is provided having a movable member located on a rod and having terminating points at each end of the rod. The terminating points are defined by stop blocks.

To provide precise locations for stopping the movable member, crowned stop blocks are provided in the barrier end so that the movable member stops exactly at the center point of the crowned stop block. The crowned stop blocks are precision manufactured parts manufactured to the specification and tolerances of the North American Automotive Metric Standards. Hence, these precision crowned stop blocks are known in the industry as NAAMS™ stop blocks. Although the NAAMS™ stop block provides a precise location stop of the movable member, in many applications, a proximity sensor/switch is also required to sense the position of the moving object.

Since the use of a proximity switch and a NAAMS™ stop block are used in many applications, it is desirable to incorporate the proximity switch within the NAAMS™ stop block such that it provides a single component having dual functions. Providing a NAAMS™ stop block with a proximity switch incorporated therein would eliminate the need to adjust the position of the proximity switch each time there is an adjustment for the NAAMS™ stop block.

SUMMARY OF THE INVENTION

The invention is an improved stop block especially for a stop block manufactured to industry standards which provides a locating device for a movable member wherein the stop block has at least one crowned end for positively positioning and facing the movable member and to accurately stop the movable member in the center of a crowned end when the movable member comes in contact with the stop block. The improvement includes a proximity switch installed within the stop block for sensing when the movable member contacts the stop block. The improved stop block of the present invention is interchangeable within other existing stop block applications manufactured and assembled to industry-wide specifications.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENTS

Figure 1:
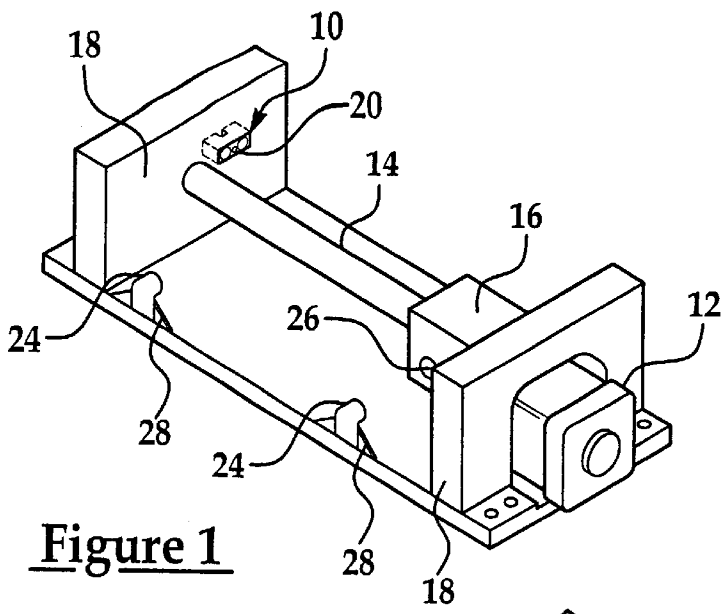
FIG. 1 is a perspective view of a typical application of a stop block manufactured to the industry standards where the assembly includes a proximity switch separate from the stop block.

Looking at FIG. 1, there is shown a typical application of a stop block 10 manufactured to certain industry standards, and particularly to standards set by the North American Automotive Metric Standards, hereinafter referred to as NAAMS™. The application may include a cylinder 12 having at least one rod 14 and a plate 16 attached to said rod such that the plate 16 reciprocally moves with the reciprocal movement of the rod. (The plate 16 may be replaced with a piston or other movable member attached to the rod 14.) The movement of the rod 14 and plate 16 are bounded by terminating points 18, and particularly are bounded by terminating points 18 having NAAMS™ stop blocks 10 incorporated therein. The NAAMS™ stop block 10 is positioned to the terminating points or end barriers 18 such that the crowned end surface 20 of the stop block 10 faces the plate 16. The crowned end surface 20 of the NAAMS™ stop block 10 has a precise center point which contacts the plate such that the plate 16 stops at the precise and measurable location each time the plate 16 contacts the stop block 10.

In the prior art, a particular application of a reciprocally moving plate 16 or cylinder 12 would require a sensing device to determine when the plate 16 had arrived at one end of its stroke or the other, as well as precisely stopping the plate 16 at the predetermined locations. Although the NAAMS™ stop block 10 would precisely stop the plate 16 at a predetermined location, it does not provide a sensing means for the operator to know when the plate 16 had reached the end of its stroke or when the plate 16 had been stopped by the NAAMS™ stop block 10. As a result, the prior art required a proximity switch 24 positioned adjacent to each end of the stroke of the plate 16 at a stationary point along the side of the rods 14. Flags 26 were then positioned along the side ends of the plate 16 so that as the plate 16 moved toward one end of its stroke, the proximity switch 24 adjacent to that end would sense the flag 26 when the plate 16 contacts the stop block 10 and thereby sends the appropriate signal. The present invention desires to eliminate the separate proximity switches 24 that are located along the side ends of the reciprocal cylinder and the brackets 28 upon which the proximity switches 24 are mounted. Further, the present invention desires to eliminate the need of separate flags 26 in most instances.

Figure 2:
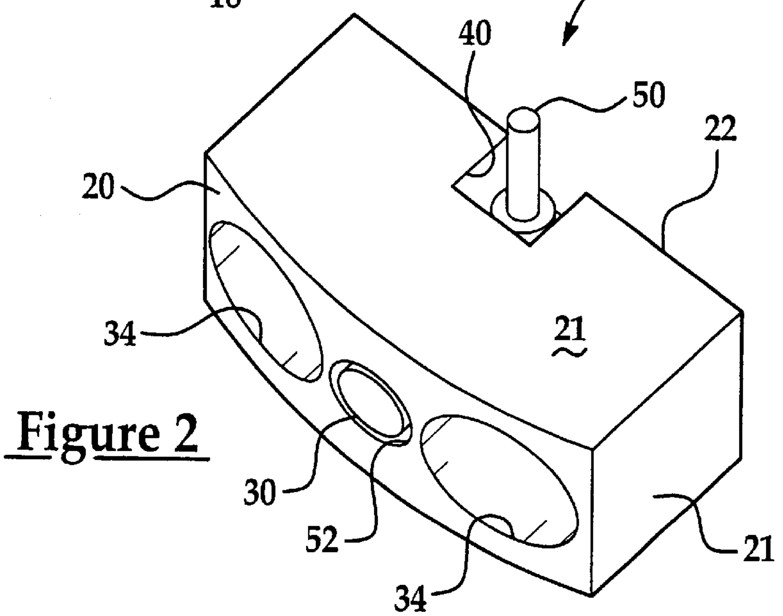
FIG. 2 is a stop block manufactured to an industry standard having a proximity switch incorporated therein according to the present invention.
Figure 3:
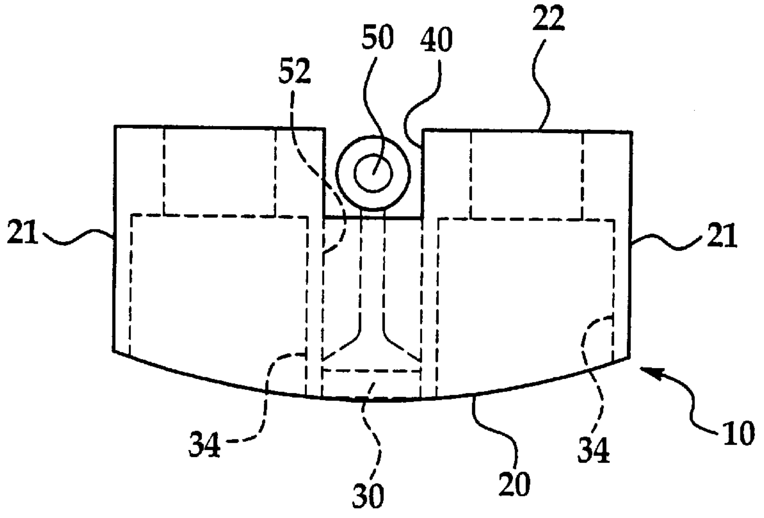
FIG. 3 is a top planar view of the stop block in FIG. 2, with certain details shown in hidden lines.

FIGS. 2–5 show a NAAMS™ stop block 10 with a proximity switch 30 installed therein. In FIGS. 2 and 3, the proximity switch 30 is positioned in the crowned end surface 20 at the precise center section of the stop block 10 so that the proximity switch 30 is exposed. A conventional NAAMS™ stop block 10 includes a pair of through apertures 34 (shown in hidden lines) extending from the crowned end surface 20 to the opposite wall 22 for bolting the NAAMS™ stop block 10 to an end wall of a cylinder or slide assembly. A center through aperture 52 extends from the crowned end surface 20 to the opposite wall 22 for feeding the proximity switch 30 into the NAAMS™ stop block. In other embodiments, the through aperture 52 may extend through an adjacent wall 21 of the crown end surface 20. A top notch 40 may be cut into the back or opposite wall 22 for fitting the electric conduit 50 of the proximity switch 30 therethrough for communication to an appropriate controller device (not shown).

The installation and position of the proximity switch within the NAAMS™ stop block 10 as shown in FIGS. 2–3 wherein the proximity sensor 30 is exposed in the crowned end surface 20 of the stop block 10 is preferred for applications where the plate or other movable member 16 is moving towards the NAAMS™ stop block 10 in a horizontal direction.

Figure 4:
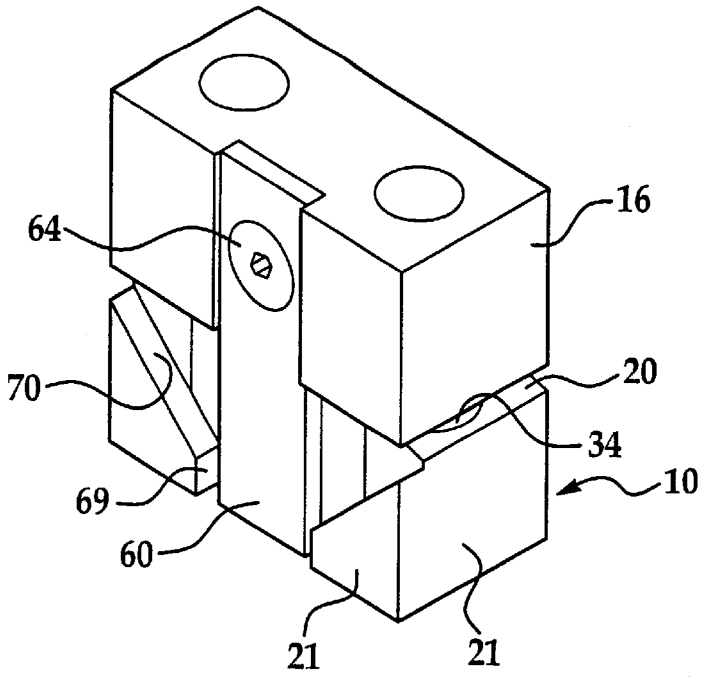
FIG. 4 is a perspective view of one side of a stop block manufactured according to industry standards therein according to a third embodiment for use in vertical applications, wherein the stop block is in contact with a movable member.
Figure 5:
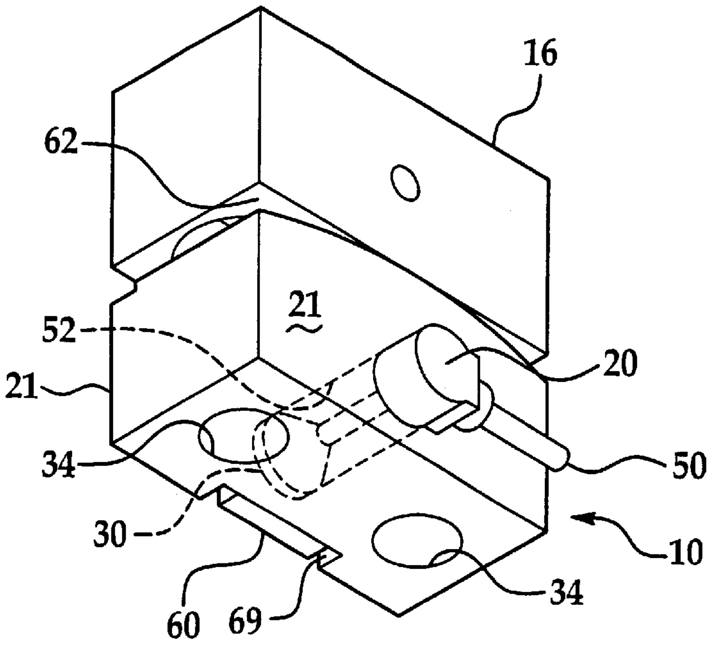
FIG. 5 shows a perspective view of the opposing side of the stop block and movable member in FIG. 4 with certain details shown in hidden lines.
Figure 6:
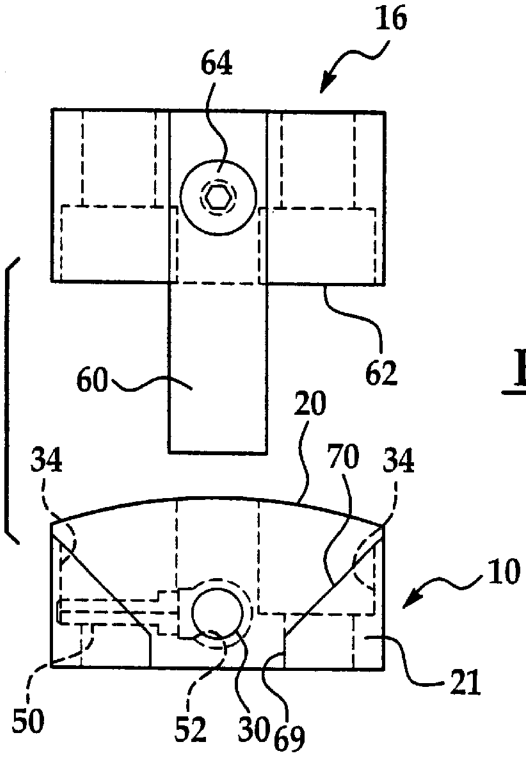
FIG. 6 is a elevational view of the stop block and movable member of FIGS. 4 and 5 in a separated condition with certain details shown in hidden lines.
Figure 7:
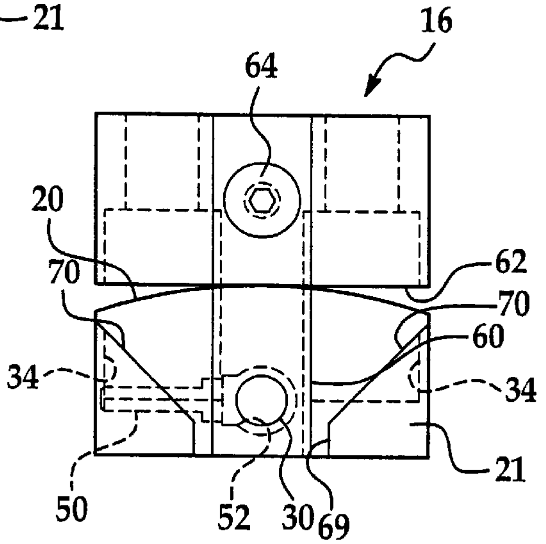
FIG. 7 is a elevational view of the stop block and movable member of FIGS. 4 and 5 in a contact condition with certain details shown in hidden lines.

In conditions and applications where the plate or movable member 16 is moving in a vertical direction, it is not advised to place a proximity switch 30 in a vertical position such that the proximity switch 30 is facing upwardly. A proximity switch 30 placed in an upward position can inadvertently be damaged or provide false readings by objects, both metallic and non-metallic, falling onto the proximity switch 30 by way of gravity. FIGS. 4–7 show various views of an alternative embodiment for use in applications where the plate or other movable member 16 is moving in a vertical direction. FIGS. 4, 5, and 7 show a movable member 16 in contact with the NAAMS™ stop block 10. FIGS. 6 and 7 show sectional views of the movable member 16 and NAAMS™ stop block 10, wherein FIG. 6 shows the movable member 16 approaching, but spaced, from the NAAMS™ stop block 10, while FIG. 7 shows the movable member 16 in contact with the NAAMS™ stop block 10. Looking at FIG. 6, the NAAMS™ stop block 10 is shown to provide a aperture 52 for the proximity switch 30 such that it is on a vertical wall of the NAAMS™ stop block 10 so that it is not facing vertically upward on the crowned end surface 20. The vertical wall in this embodiment can be any of the four adjacent walls 21 to the crowned end surface 20. The movable member 16 is then provided with a flag 60 releasably secured with a bolt 64 to the movable member 16 such that a portion of the flag 60 extends beyond the peripheral edges of the movable member 16. The flag 60 is positioned so that it will contact or cover the proximity switch 30 precisely when the forward wall 62 of the movable member 16 contacts the NAAMS™ stop block 10. FIGS. 4 and 7 show the movable member 16 in contact with the NAAMS™ stop block 10, and covering the proximity switch 30. The proximity switch 30 is not shown in FIG. 4; and the proximity switch is shown in hidden lines in FIG. 7.

Figure 8:
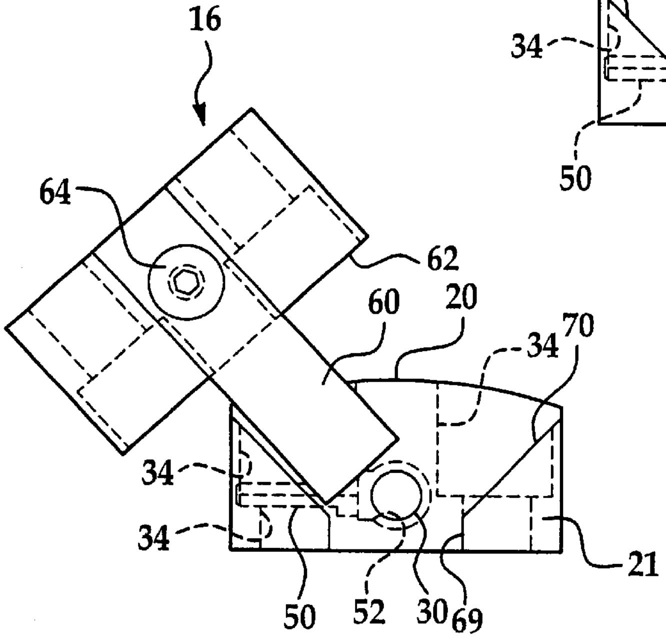
FIG. 8 is a elevational view of the movable member in FIG. 6 approaching the stop block from an angular direction with certain details shown in hidden lines.

Further, as can be seen in FIGS. 4, 6, 7, and 8 the NAAMS™ stop block 10 can also be adapted to sense a movable member 16 coming into contact with the stop block 10 from an angular direction. A cavity 69 having an angular portion 70 is provided for receiving the flag 60 as the movable member 16 approaches and then contacts the NAAMS™ stop block 10. The cavity 69 allows the movable member 16 and its associated flag 60 to approach the NAAMS™ stop block 10 such that the flag 60 is sensed by the proximity sensor 40 when the movable member 16 contacts the NAAMS™ stop block 10. FIG. 8 shows the movable member 16 approaching the NAAMS™ stop block from an angular direction according to this embodiment. The angularity of the portion cavity 70 can be changed according to the application of the system and the relative movement of the movable member 16 in relationship with the NAAMS™ stop block 10.

The improved embodiments of the NAAMS™ stop block 10 provides a universal device that does not require adjustment when the reciprocal member of an assembly is realigned or changed. The improved stop block 10 having a proximity switch 30 further eliminates brackets for positioning proximity switches 30 along the sides of the cylinder assembly.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In an assembly having a moving member traveling a path having at least one stopping point, said stopping point defined by a stop block assembled to industry-wide specifications for providing a locating and contacting point for the movable member, the stop block having at least one crowned end wall for positioning to face the movable member and an adjacent wall, to accurately stop the movable member in a designated location on the crowned end wall when said movable member comes in contact with the stop block, the improvement comprising:

a proximity switch installed within the stop block wherein said proximity switch is exposed from one of the crowned end wall and the adjacent wall for sensing when the movable member contacts the stop block.

2. The improvement of claim 1, wherein the movable member has a flag extending from the peripheral edges of the movable member and the proximity switch senses the flag when the movable member contacts the crowned end wall of the stop block.

3. The improvement of claim 2, wherein the stop block is structurally configured for sensing the movable member from an angular direction.

4. The improvement of claim 2, wherein a groove is formed on the adjacent wall of the stop block for receiving the flag.

5. The improvement of claim 3, wherein an angular groove is formed on the adjacent wall for receiving the flag from an angular direction.

6. The improvement of claim 1, wherein the stop block is assembled to standards set by the North American Automotive Metric Standards.

* * * * *